(12) United States Patent
Jiang et al.

(10) Patent No.: US 11,342,879 B2
(45) Date of Patent: May 24, 2022

(54) N-PHASE N+1 BRIDGE ARM INVERTER AND MODULATION METHOD THEREOF

(71) Applicant: HUAZHONG UNIVERSITY OF SCIENCE AND TECHNOLOGY, Hubei (CN)

(72) Inventors: Dong Jiang, Hubei (CN); An Li, Hubei (CN); Zicheng Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 29 days.

(21) Appl. No.: 17/040,553

(22) PCT Filed: Mar. 21, 2019

(86) PCT No.: PCT/CN2019/078987
§ 371 (c)(1),
(2) Date: Sep. 23, 2020

(87) PCT Pub. No.: WO2020/019741
PCT Pub. Date: Jan. 30, 2020

(65) Prior Publication Data
US 2021/0044244 A1 Feb. 11, 2021

(30) Foreign Application Priority Data

Jul. 23, 2018 (CN) .......................... 201810813828.7

(51) Int. Cl.
*H02P 27/12* (2006.01)
(52) U.S. Cl.
CPC .................................. *H02P 27/12* (2013.01)

(58) Field of Classification Search
CPC .......... H02P 27/12; H02P 21/26; H02P 25/22; H02P 21/28; H02P 27/08
(Continued)

(56) References Cited

U.S. PATENT DOCUMENTS

| 5,194,796 A | * | 3/1993 | Domeki | H02P 8/14 318/685 |
| 9,859,823 B2 | * | 1/2018 | Roesner | G01R 25/00 |
| 10,778,136 B2 | * | 9/2020 | Hellstroem | H02P 25/22 |

FOREIGN PATENT DOCUMENTS

CN 105811834 7/2016

OTHER PUBLICATIONS

"International Search Report (Form PCT/ISA/210) of PCT/CN2019/078987", dated Jun. 21, 2019, with English translation thereof, pp. 1-5.
(Continued)

*Primary Examiner* — David Luo
(74) *Attorney, Agent, or Firm* — JCIP Global Inc.

(57) ABSTRACT

The disclosure provides an N-phase N+1 bridge arm inverter, including: N+1 bridge arms, wherein each of the bridge arms includes an upper bridge arm power switching device and a lower bridge arm power switching device, upper node of the upper bridge arm power switching device in each of the bridge arms is connected to a DC bus voltage, lower node of the lower bridge arm power switching device is connected to a power ground, and lower node of the upper bridge arm power switching device is connected to upper node of the lower bridge arm power switching device as an output node of the bridge arm. N is a total phase number of a motor, N is an odd number, and N is greater than 3.

7 Claims, 4 Drawing Sheets

(58) Field of Classification Search
USPC .................................................. 318/503, 494
See application file for complete search history.

(56) References Cited

OTHER PUBLICATIONS

Yu Fei, et al., "Multi-Phase Carrier PWM Control Technology Based on Zero-Sequence Signal Injection," Transactions of China Electrotechnical Society, vol. 24, Feb. 2009, pp. 127-131.

* cited by examiner

N-PHASE N+1 BRIDGE ARM INVERTER AND MODULATION METHOD THEREOF

CROSS-REFERENCE TO RELATED APPLICATION

This application is a 371 of international application of PCT application serial no. PCT/CN2019/078987, filed on Mar. 21, 2019, which claims the priority benefit of China application no. 201810813828.7, filed on Jul. 23, 2018. The entirety of each of the above mentioned patent applications is hereby incorporated by reference herein and made a part of this specification.

BACKGROUND

Technical Field

The disclosure belongs to the field of AC motor and drive control, and more specifically, relates to an N-phase N+1 bridge arm inverter topology structure and a modulation method thereof.

Description of Related Art

In recent years, due to the advantages of multi-phase motors such as small torque ripple, low requirement in capacity of power device, and strong capability for fault tolerance, multi-phase motors and the control technologies thereof have attracted increased attention. In the study of driving multi-phase motor, the half-bridge inverter topology is the basic topology structure of conventional multi-phase inverters.

In the half-bridge inverter structure, one end of the motor stator winding of the multi-phase motor is connected to the phase bridge arm, and another end is in a star connection (or a Y connection) to form a neutral point. The topology structure has the following defects.

(1) Since the stator winding of the motor has a neutral point, and the neutral point is floated, and thus same component in the stator current (that is, the zero-axis current component) cannot communicate. Since such topology structure does not have a zero-axis current path, freedom of controlling the stator current is largely reduced. To some multi-phase motors which zero-axis current are required, such type of topology structure cannot be adopted.

(2) In this topology, the maximum fundamental wave voltage amplitude that can be generated in the output voltage is about half of the DC bus voltage, which leads to a narrow speed range of the motor and limits the operating range of the motor. To improve the operating range of the motor, there is necessity to increase the DC bus voltage, which will increase cost of the entire driving system, while reducing the reliability and power density.

(3) Due to the existence of the neutral point, the phase voltages affect one another. When a stator winding of a certain phase in the motor fails, voltage of stator windings of other phases which are properly functioning will be affected, and consequently leads to failure of the motor and resulted in worse fault tolerance.

In the related art, there is an N-phase full-bridge inverter topology structure. Each H-bridge inverter controls one phase of the stator winding, which can overcome the above-mentioned shortcomings of the N-phase half-bridge inverter topology, but this type of topology structure on the other hand has shortcomings such as a large number of power devices, high system cost, low power density and large operation loss. Therefore, in the field of driving multi-phase motor, it has been difficult to reconcile the contradictions between performance, cost, and power density of motor driver and it is hard to reach an optimal matching solution between them.

SUMMARY

Technical Problem

In view of the defects of related art, the disclosure provides an N-phase N+1 bridge arm inverter topology structure and a modulation method thereof.

The disclosure provides an N-phase N+1 bridge arm inverter, including: N+1 bridge arms, wherein each of the bridge arms includes an upper bridge arm power switching device and a lower bridge arm power switching device, upper node of the upper bridge arm power switching device in each of the bridge arms is connected to a DC bus voltage, lower node of the lower bridge arm power switching device is connected to a power ground, and lower node of the upper bridge arm power switching device is connected to upper node of the lower bridge arm power switching device as an output node of the bridge arm. N is a total phase number of a motor, N is an odd number, and N is greater than or equal to 3.

Specifically, when stator windings of the motor are symmetrically distributed, a phase difference between adjacent corresponding electromotive forces is $\alpha=2\pi/N$.

Specifically, starting from a first phase, all stator windings are arranged in an order of electrical angle interval $\Delta n\alpha$ and connected end to end, thereby leading to N+1 motor winding nodes; $\Delta n$ is the number of arrangement intervals, the value of $\Delta n$ may be taken from integers of 1 to $(N-1)/2$ that are relatively prime to N, the value of each $\Delta n$ corresponds to a connection sequence of a phase winding, and the N+1 motor winding nodes are sequentially connected to N+1 bridge arm output nodes.

Specifically, a relationship between output voltage vectors of the N+1 bridge arms and N phase voltage vectors is that, the phase voltage is equal to the bridge arm voltage connected at its right node minus the bridge arm voltage connected at its left node; where $V_{p(i)}=V_{l(k)}-V_{l(k+1)}$ $i,k \in (1, 2, \ldots, n)$, wherein an N-dimensional phase voltage vector is $[V_{p(1)}, V_{p(2)}, \ldots, V_{p(n)}]^T$, an N+1-dimensional arm voltage vector is $[V_{l(1)}, V_{l(2)}, \ldots, V_{l(n+1)}]^T$.

The disclosure further provides a modulation method for an N-phase N+1 bridge arm inverter, including the following steps.

According to a relationship $V_{p(i)}=V_{l(k)}-V_{l(k+1)}$ between output voltage vectors of N+1 bridge arms and N phase voltage vectors, N+1 bridge arm voltage values are obtained.

N+1 bridge arm voltage values are compared with a carrier triangle wave to obtain a real-time duty ratio, and square wave drive signals of each bridge arm power device are generated according to the real-time duty ratio to realize a carrier-mode PWM voltage modulation of common mode voltage injection.

Specifically, when the number of arrangement intervals is $\Delta n=(N-1)/2$, the maximum fundamental phase voltage amplitude generated by the N-phase N+1 bridge arm inverter is a DC bus voltage $U_{dc}$.

Under a generalized synchronous coordinate system, voltage values of the N+1 bridge arms are obtained according to the relationship between the output voltage vectors of the N+1 bridge arms and the N phase voltage vectors, i.e., $V_{p(i)}=V_{l(k)}-V_{l(k+1)}$.

(1) Compared with the N-phase half-bridge inverter topology, when driving a multi-phase motor load that does not require zero-axis current, the N-phase N+1 bridge arm inverter has a high DC voltage utilization rate and can be applied to the circumstances where the DC bus voltage is limited and high DC voltage utilization is required, such as electric vehicles, ship propulsion systems and other fields.

(2) Compared with the N-phase half-bridge, the N-phase N+1 bridge arm inverter topology structure has good fault tolerance performance. If a phase winding is broken, the operation of other windings will not be affected.

(3) The N-phase N+1 bridge arm inverter topology has a zero-axis current path and has the ability to control the zero-axis current, while the N-phase half-bridge inverter cannot circulate and control the zero-axis current. In motor loads that require zero-axis current (such as DC excited motors, switched reluctance motors, and current harmonic injection into multi-phase motors, etc.), the N-phase half-bridge topology cannot be adopted. On the contrary, the N-phase N+1 bridge arm inverter is not restricted in this regard. The application range of N-phase N+1 bridge arm inverter topology is broader.

(4) In the N-phase N+1 bridge arm inverter, except for bridge arm 1 and bridge arm N+1, the other bridge arms do not circulate zero-axis current. Therefore, in the N+1 bridge arm N-phase inverter, the current stress of the bridge arm power device is low, which further reduces the cost of the device and the operating efficiency of system is high.

DESCRIPTION OF THE EMBODIMENTS

In order to make the purposes, technical solutions and advantages of the disclosure clearer, the disclosure will be further described in detail below with reference to the accompanying drawings and embodiments. It should be understood that the specific embodiments described herein are only used to explain the disclosure and are not intended to limit the disclosure.

In view of the defects of related art, the disclosure can reduce the number of power devices in the inverter topology, reduce the capacity of the inverter system, reduce the cost of drive system, increase power density, improve DC voltage utilization rate, enhance the topology fault tolerance, and realize control of complete freedom of stator current.

To achieve the above purpose, in a first aspect, the disclosure provides an N-phase N+1 bridge arm inverter topology, including: bridge arm 1 to bridge arm n+1, a total of N+1 bridge arms, wherein N(=n) is the total phase number of the motor, N is an odd number, and N is greater than or equal to 3. When the stator windings of the motor are distributed symmetrically, the phase difference between adjacent corresponding electromotive forces is $\alpha=2\pi/N$.

Each bridge arm includes an upper bridge arm power switch device and a lower bridge arm power switch device (the power switch device can be a two-phase fully controlled power device such as IGBT or MOSFET with anti-parallel diode). Upper node of the upper bridge arm power switching device in each of the bridge arms is connected to a DC bus voltage, lower node of the lower bridge arm power switching device is connected to a power ground, and lower node of the upper bridge arm power switching device is connected to upper node of the lower bridge arm power switching device as an output node of the bridge arm.

In the N-phase N+1 bridge arm inverter topology, it is set that $V_{p(1)}$, $V_{p(2)}$, ..., $V_{p(n)}$ respectively correspond to the voltage of the winding terminal in the first, second, ..., n-phase stator windings of the motor. It is set that $V_{I(1)}$, $V_{I(2)}$, ..., $V_{I(n+1)}$ respectively correspond to the output node voltage of the 1st to n+1 bridge arms. It is set that $\alpha=2\pi/N$ is the electrical angle between adjacent voltage phasors.

Taking the first phase of the motor as the reference phase, the left node of the stator winding corresponds to an anode of the winding end voltage, and the right node of the winding corresponds to a cathode of the winding end voltage. Note $\Delta n$ as the number of arrangement intervals. The possible values of $\Delta n$ are integers from 1 to (N−1)/2 that are relatively prime to N. Each value of $\Delta n$ corresponds to a connection sequence of phase windings. For multi-phase motor with different phase numbers, the number of values of $\Delta n$ also vary. That is, there are many ways to connect the phase windings of multi-phase motor, and because 1 and (N-1)/2 must be prime to N, there are at least two connection sequences for the phase windings of multi-phase motor. When $\Delta n$ is set as a certain value, the corresponding specific phase winding connection sequence and connection method of the phase winding and bridge arm are described as follows.

Starting from the first phase, all stator windings are arranged in the order of electrical angle interval $\Delta n\alpha$ (1, 1+$\Delta n$, 1+2$\Delta n$,) and connected end to end, thereby leading to N+1 motor winding nodes. The N+1 motor winding nodes are sequentially connected to the N+1 bridge arm output nodes in sequence, thereby obtaining an N-phase N+1 bridge arm inverter topology structure. For example, in a five-phase motor, N=5 and (N−1)/2=2, so $\Delta n$ can be equal to 1 and 2, then there are two kinds of arrangement orders for the five-phase winding, which are (-1-2-3-4-5-) and (-1-3-5-2-4-), wherein "-" is a node, thus leading to 6 nodes. By connecting the 6 nodes to the bridge arms 1 to 6 in sequence, two kinds of five-phase six-bridge arm inverter topology structures can be obtained.

In a second aspect, the disclosure provides a carrier-mode PWM voltage modulation method for the common-mode voltage injection of the N-phase N+1 bridge arm inverter topology structure, which can be established with respect to topologies of any phase and $\Delta n$ set with any values, including:

It is set that the N-dimensional phase voltage vector generated by the N-phase N+1 bridge arm inverter is $[V_{p(1)}, V_{p(2)}, \ldots, V_{p(n)}]^T$, an N+1-dimensional arm voltage vector is $[V_{I(1)}, V_{I(2)}, \ldots, V_{I(n+1)}]^T$. According to the topology structure, the relationship between the output voltage vectors of N+1 bridge arms and the N phase voltage vectors is:

$$V_{p(i)} = V_{I(k)} - V_{I(k+1)} \quad i,k \in (1, 2, \ldots, n) \tag{1}$$

When the carrier PWM strategy is used to modulate the phase voltage, it is necessary to determine the magnitude of the output voltage vector of the bridge arm when the phase voltage vector is determined. In the above correlation expression, number of the unknown bridge arm voltage vectors is N+1, and number of the unknown equations is N, so theoretically there are infinite solutions. The following provides a method to obtain the bridge arm voltage vector in a generalized synchronous coordinate system, which is described as follows:

First, according to the generalized PARK transformation, the N-dimensional reference phase voltage vector to be modulated in the stationary coordinate system can be converted into N reference phase voltage component vectors in the N-dimensional synchronous coordinate system.

$$\begin{bmatrix} V_{d(1)} \\ V_{q(1)} \\ V_{d(3)} \\ V_{q(3)} \\ \vdots \\ V_{d(n-2)} \\ V_{q(n-2)} \\ V_0 \end{bmatrix} = P \cdot \begin{bmatrix} V_{p(1)} \\ \vdots \\ V_{p(k)} \\ \vdots \\ V_{p(n)} \end{bmatrix} \quad (2)$$

Specifically, $$P = \frac{2}{N}\begin{bmatrix} \cos\theta & \cos(\theta-\alpha) & \ldots & \cos(\theta-(n-1)\alpha) \\ -\sin\theta & -\sin(\theta-\alpha) & \ldots & -\sin(\theta-(n-1)\alpha) \\ \cos 3\theta & \cos 3(\theta-\alpha) & \ldots & \cos 3(\theta-(n-1)\alpha) \\ -\sin 3\theta & -\sin 3(\theta-\alpha) & \ldots & -\sin 3(\theta-(n-1)\alpha) \\ \vdots & \vdots & \vdots & \vdots \\ \cos(n-2)\theta & \cos(n-2)(\theta-\alpha) & \ldots & \cos(n-2)(\theta-(n-1)\alpha) \\ -\sin(n-2)\theta & -\sin(n-2)(\theta-\alpha) & \ldots & -\sin(n-2)(\theta-(n-1)\alpha) \\ 0.5 & 0.5 & \ldots & 0.5 \end{bmatrix} \quad (3)$$

In order to modulate phase voltages being required, the bridge arm voltage vector can be expressed as a linear combination of 2-dimensional planar dq-axis phase voltage component vectors with an amount of (N−1)/2 and one zero-axis phase voltage component vector as follows.

Specifically, $\beta = \Delta n \cdot \alpha$. It is easy to prove that when the bridge arm voltage vector is expressed in formula (4), the required relationship between the phase voltage and the bridge arm voltage is always satisfied, that is, formula (1) can always be established.

For ease of calculation, the linear combination of the dq-axis phase voltage component vectors in each plane of the bridge arm voltage in the generalized synchronous coordinate system is recorded as the dq-axis bridge arm voltage component vectors in the plane. In the m-th plane of the generalized synchronous coordinate system (m=1, 3, 5, ..., n−2), according to the analysis and calculation above, the dq-axis bridge arm voltage component vector can be obtained directly from the dq-axis phase voltage component vector in each plane.

$$\begin{bmatrix} V_{ld(m)} \\ V_{lq(m)} \end{bmatrix} = \frac{1}{2}\begin{bmatrix} V_{d(m)} + V_{q(m)}\cot\frac{m\beta}{2} \\ V_{q(m)} - V_{d(m)}\cot\frac{m\beta}{2} \end{bmatrix} \quad (5)$$

Therefore, formula (4) can be rewritten as a modified inverse PARK transformation formula:

$$\begin{bmatrix} V_{l(1)} \\ \vdots \\ V_{l(k+1)} \\ \vdots \\ V_{l(n+1)} \end{bmatrix} = inv(P') \cdot \begin{bmatrix} V_{ld(1)} \\ V_{lq(1)} \\ V_{ld(3)} \\ V_{lq(3)} \\ \vdots \\ V_{ld(n-2)} \\ V_{lq(n-2)} \\ V_0 \end{bmatrix} \quad (7)$$

$$\begin{bmatrix} V_{l(1)} \\ \vdots \\ V_{l(k+1)} \\ \vdots \\ V_{l(n+1)} \end{bmatrix} = \underbrace{\begin{bmatrix} \cos\theta & -\sin\theta \\ \vdots & \vdots \\ \cos(\theta-k\beta) & -\sin(\theta-k\beta) \\ \vdots & \vdots \\ \cos(\theta-n\beta) & -\sin(\theta-n\beta) \end{bmatrix}\begin{bmatrix} \frac{1}{2}\left(V_{d(1)} + V_{q(1)}\cot\frac{\beta}{2}\right) \\ \frac{1}{2}\left(V_{q(1)} - V_{d(1)}\cot\frac{\beta}{2}\right) \end{bmatrix}}_{\text{component in subspace 1}} + \underbrace{\begin{bmatrix} \cos 3\theta & -\sin 3\theta \\ \vdots & \vdots \\ \cos 3(\theta-k\beta) & -\sin 3(\theta-k\beta) \\ \vdots & \vdots \\ \cos 3(\theta-n\beta) & -\sin 3(\theta-n\beta) \end{bmatrix}\begin{bmatrix} \frac{1}{2}\left(V_{d(3)} + V_{q(3)}\cot\frac{3\beta}{2}\right) \\ \frac{1}{2}\left(V_{q(3)} - V_{d(3)}\cot\frac{3\beta}{2}\right) \end{bmatrix}}_{\text{component in subspace 3}} + \quad (4)$$

$$\ldots + \underbrace{\begin{bmatrix} \cos(n-2)\theta & -\sin(n-2)\theta \\ \vdots & \vdots \\ \cos(n-2)(\theta-k\beta) & -\sin(n-2)(\theta-k\beta) \\ \vdots & \vdots \\ \cos(n-2)(\theta-n\beta) & -\sin(n-2)(\theta-n\beta) \end{bmatrix}\begin{bmatrix} \frac{1}{2}\left(V_{d(n-2)} + V_{q(n-2)}\cot\frac{(n-2)\beta}{2}\right) \\ \frac{1}{2}\left(V_{q(n-2)} - V_{d(n-2)}\cot\frac{(n-2)\beta}{2}\right) \end{bmatrix}}_{\text{component in subspace (n-2)}} + \underbrace{\begin{bmatrix} 0.5n \\ \vdots \\ 0.5n-k \\ \vdots \\ -0.5n \end{bmatrix} V_0}_{\text{component in zero sequence}}$$

Specifically, $$inv(P') = \begin{bmatrix} \cos\theta & -\sin\theta & \cos3\theta & -\sin3\theta & \cdots & \cos(n-2)\theta & -\sin(n-2)\theta & 0.5n \\ \vdots & \vdots & \vdots & \vdots & \cdots & \vdots & \vdots & \vdots \\ \cos(\theta-k\beta) & -\sin(\theta-k\beta) & \cos3(\theta-k\beta) & -\sin3(\theta-k\beta) & \cdots & \cos(n-2)(\theta-k\beta) & -\sin(n-2)(\theta-k\beta) & 0.5n-k \\ \vdots & \vdots & \vdots & \vdots & \cdots & \vdots & \vdots & \vdots \\ \cos(\theta-n\beta) & -\sin(\theta-n\beta) & \cos3(\theta-n\beta) & -\sin3(\theta-n\beta) & \cdots & \cos(n-2)(\theta-n\beta) & -\sin(n-2)(\theta-n\beta) & 0.5n-n \end{bmatrix} \quad (8)$$

Assuming that $V_{l(max)}$ and $V_{l(min)}$ are the maximum and minimum values of the N+1-dimensional bridge arm voltage vector derived from formula (7), the injected common mode voltage component vector can be obtained as follows.

$$V_{cm} = -\frac{V_{l(max)} + V_{l(min)}}{2} \quad (9)$$

All the N+1 bridge arm voltages obtained by formula (7) are added to the common mode voltage component vector to obtain the voltage value of the N+1 bridge arms after the injection of the common mode voltage component vector.

Compare the voltage values of the N+1 bridge arms with the carrier triangle wave, then the real-time duty cycle ratio can be obtained, and the square wave driving signals of each bridge arm power devices can be generated, thereby realizing the carrier PWM voltage modulation method with common mode voltage injection.

It can be proved that, for the N-phase N+1 bridge inverter modulated by the above carrier PWM voltage modulation method with common mode voltage injection, no matter what N is, when Δn=(N−1)/2, the maximum fundamental wave phase voltage amplitude that can be generated is the DC bus voltage $U_{dc}$, and the DC voltage utilization rate is high.

In order to further describe the N-phase N+1 bridge arm inverter provided by the embodiment of the disclosure and the modulation method thereof, the specific embodiment will now be described in details with reference to the accompanying drawings as follows.

In the stationary coordinate system, the five-phase stator currents are $i_{n(1)}, i_{n(2)}, i_{n(3)}, i_{n(4)}$ and $i_{p(5)}$, and the five-phase stator voltages are $V_{p(1)}, V_{p(2)}, V_{p(3)}, V_{p(4)}$ and $V_{p(5)}$.

Figure 1:
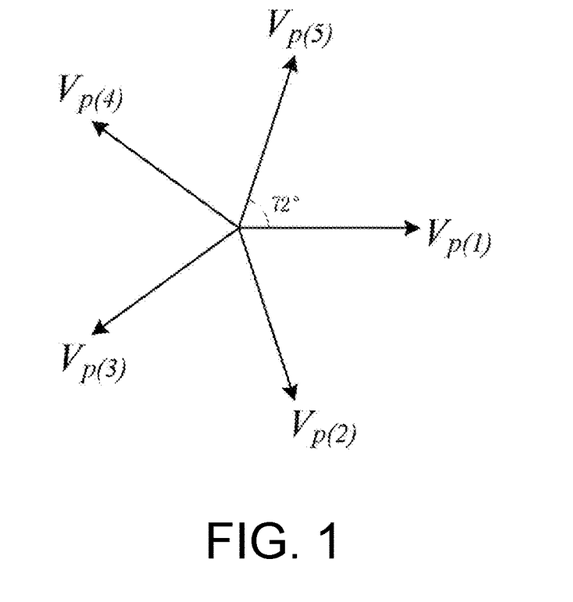
FIG. 1 shows an electric angle distribution of the stator voltage of each phase of the five-phase six-pole permanent magnet synchronous motor.
Figure 2:
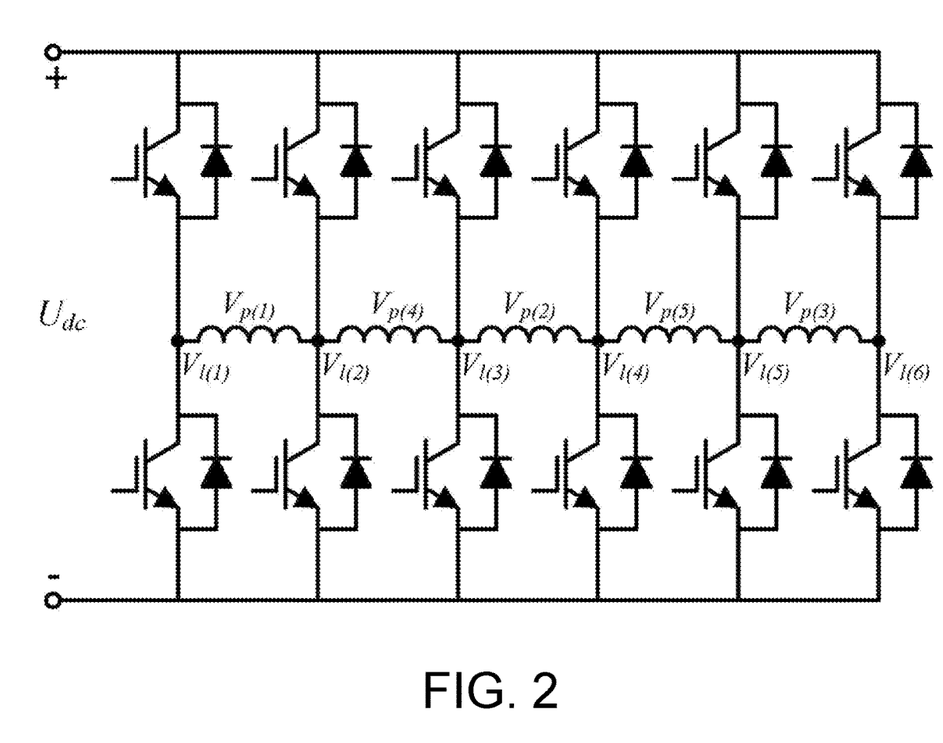
FIG. 2 is a topology structure diagram of a five-phase six-bridge arm inverter provided by the disclosure.

FIG. 2 is the phasor distribution diagram of the baseband frequency phase voltage of the five-phase motor stator. The electrical angle of the phase difference between adjacent phases is α=360°/5=72°. According to the phasor distribution diagram, taking Δn=(5−1)/2=2, it can be obtained that the arrangement order of stator winding is (-1-3-5-2-4-), and six nodes of the motor stator winding are derived. The six nodes of the motor winding are sequentially connected to the output nodes of the six bridge arms of the five-phase six-bridge arm inverter, thereby obtaining the topology structure diagram of the five-phase six-bridge arm inverter shown in FIG. 3.

Figure 3:
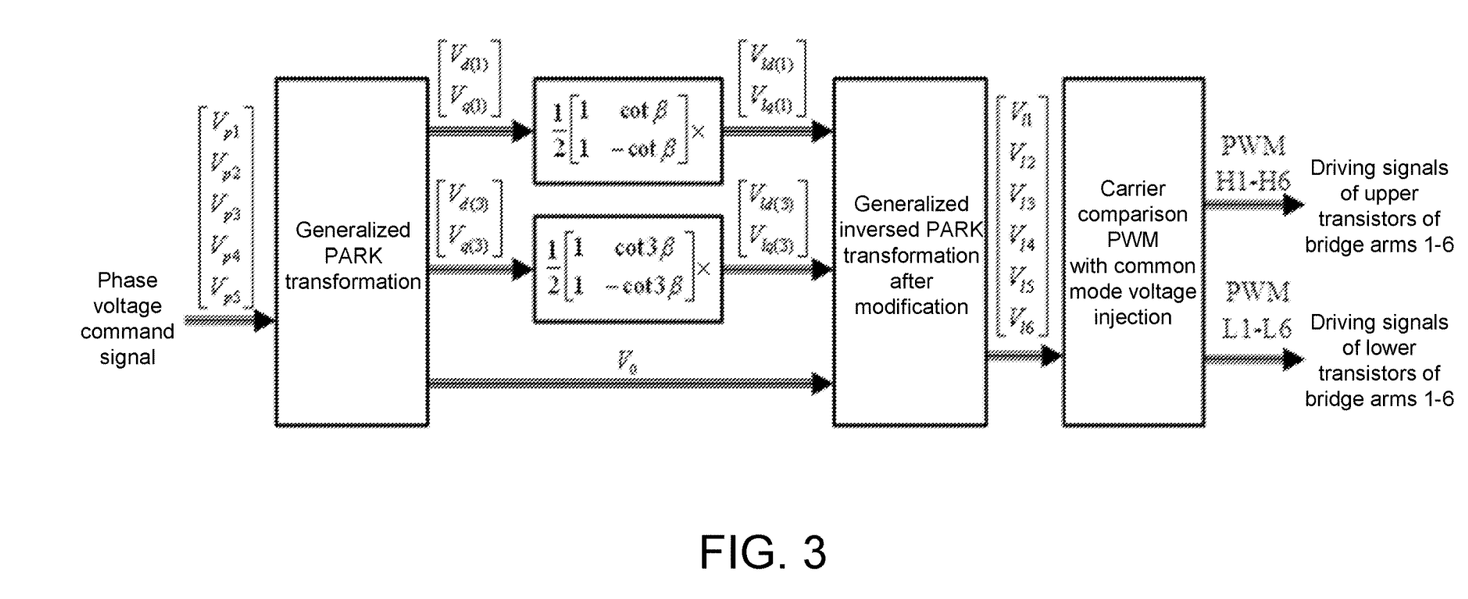
FIG. 3 is a structural diagram of a voltage modulation algorithm of a five-phase six-bridge arm inverter provided by the disclosure.

When a five-phase six-bridge arm inverter topology is used to drive a five-phase motor, the voltage modulation algorithm provided by the instant application is required to be adopted. By controlling the complementary conduction of the power switching devices in the 6 bridge arms, the five-phase stator voltage required by the motor is generated.

According to the generalized PARK transformation matrix, in a five phase system, the five phase stator voltage can be transformed into d-axis voltage component vector and q-axis phase voltage component vector in two 2-dimensional planes (fundamental planes: $V_{d(1)}$ and $V_{q(1)}$, third harmonic plane: $V_{d(3)}$ and $V_{q(3)}$) and one zero-axis phase voltage component vector $V_0$.

$$\begin{bmatrix} V_{d(1)} \\ V_{q(1)} \\ V_{d(3)} \\ V_{q(3)} \\ V_0 \end{bmatrix} = \frac{2}{5} \begin{bmatrix} \cos\theta & \cos(\theta-\alpha) & \cos(\theta-2\alpha) & \cos(\theta-3\alpha) & \cos(\theta-4\alpha) \\ -\sin\theta & -\sin(\theta-\alpha) & -\sin(\theta-2\alpha) & -\sin(\theta-3\alpha) & -\sin(\theta-4\alpha) \\ \cos3\theta & \cos3(\theta-\alpha) & \cos3(\theta-2\alpha) & \cos3(\theta-3\alpha) & \cos3(\theta-4\alpha) \\ -\sin3\theta & -\sin3(\theta-\alpha) & -\sin3(\theta-2\alpha) & -\sin3(\theta-3\alpha) & -\sin3(\theta-4\alpha) \\ 0.5 & 0.5 & 0.5 & 0.5 & 0.5 \end{bmatrix} \begin{bmatrix} V_{p(1)} \\ V_{p(2)} \\ V_{p(3)} \\ V_{p(4)} \\ V_{p(5)} \end{bmatrix} \quad (12)$$

According to the obtained d-axis and q-axis phase voltage component vectors in the two two-dimensional planes, calculate the d-axis and q-axis bridge arm voltage component vectors in the two 2-dimensional planes:

$$\begin{bmatrix} V_{ld(1)} \\ V_{lq(1)} \\ V_{ld(3)} \\ V_{lq(3)} \end{bmatrix} = 0.5 \begin{bmatrix} 1 & \cot\beta & & 0 \\ 1 & -\cot\beta & & \\ & & 1 & \cot3\beta \\ 0 & & 1 & -\cot3\beta \end{bmatrix} \begin{bmatrix} V_{d(1)} \\ V_{q(1)} \\ V_{d(3)} \\ V_{q(3)} \end{bmatrix} \quad (13)$$

Specifically, β=Δn·α=2×72°=144°.

According to the modified PARK inverse transformation according to formulas (7) and (8), the voltage vectors of the 6 bridge arms are obtained from the four bridge arm voltage component vectors and the one zero-axis phase voltage component vector in the generalized synchronous coordinate system.

$$\begin{bmatrix} V_{l(1)} \\ V_{l(2)} \\ V_{l(3)} \\ V_{l(4)} \\ V_{l(5)} \\ V_{l(6)} \end{bmatrix} = \quad (14)$$

-continued $$\begin{bmatrix} \cos\theta & -\sin\theta & \cos 3\theta & -\sin 3\theta & 2.5 \\ \cos(\theta-\beta) & -\sin(\theta-\beta) & \cos 3(\theta-\beta) & -\sin 3(\theta-\beta) & 1.5 \\ \cos(\theta-2\beta) & -\sin(\theta-2\beta) & \cos 3(\theta-2\beta) & -\sin 3(\theta-2\beta) & 0.5 \\ \cos(\theta-3\beta) & -\sin(\theta-3\beta) & \cos 3(\theta-3\beta) & -\sin 3(\theta-3\beta) & -0.5 \\ \cos(\theta-4\beta) & -\sin(\theta-4\beta) & \cos 3(\theta-4\beta) & -\sin 3(\theta-4\beta) & -1.5 \\ \cos(\theta-5\beta) & -\sin(\theta-5\beta) & \cos 3(\theta-5\beta) & -\sin 3(\theta-5\beta) & -2.5 \end{bmatrix}$$

$$\begin{bmatrix} V_{ld(1)} \\ V_{lq(1)} \\ V_{ld(3)} \\ V_{lq(3)} \\ V_0 \end{bmatrix}$$

Compare these 6 bridge arm voltages, find the maximum and minimum values $V_{l(max)}$ and $V_{l(min)}$, and calculate the common mode voltage component vector:

$$V_{cm} = -\frac{V_{l(max)} + V_{l(min)}}{2} \quad (15)$$

The common mode voltage component vector is added to all six bridge arm voltages to obtain the voltage values of the six bridge arms after the common mode voltage component vector is injected.

Compare the actual output voltage of the 6 bridge arms with the triangular carrier. When the bridge arm voltage is greater than the carrier signal, the upper bridge arm is turned on and the lower bridge arm is cutoff. When the bridge arm voltage is less than the carrier signal, the lower bridge arm is turned on and the upper bridge arm is cutoff. Therefore, the driving square wave signal of the power switching device in each bridge arm can be obtained, and the driving square wave signal is input into the driving circuit, such that the driving circuit can drive the power switching device to generate the required motor stator phase voltages.

Figure 4:
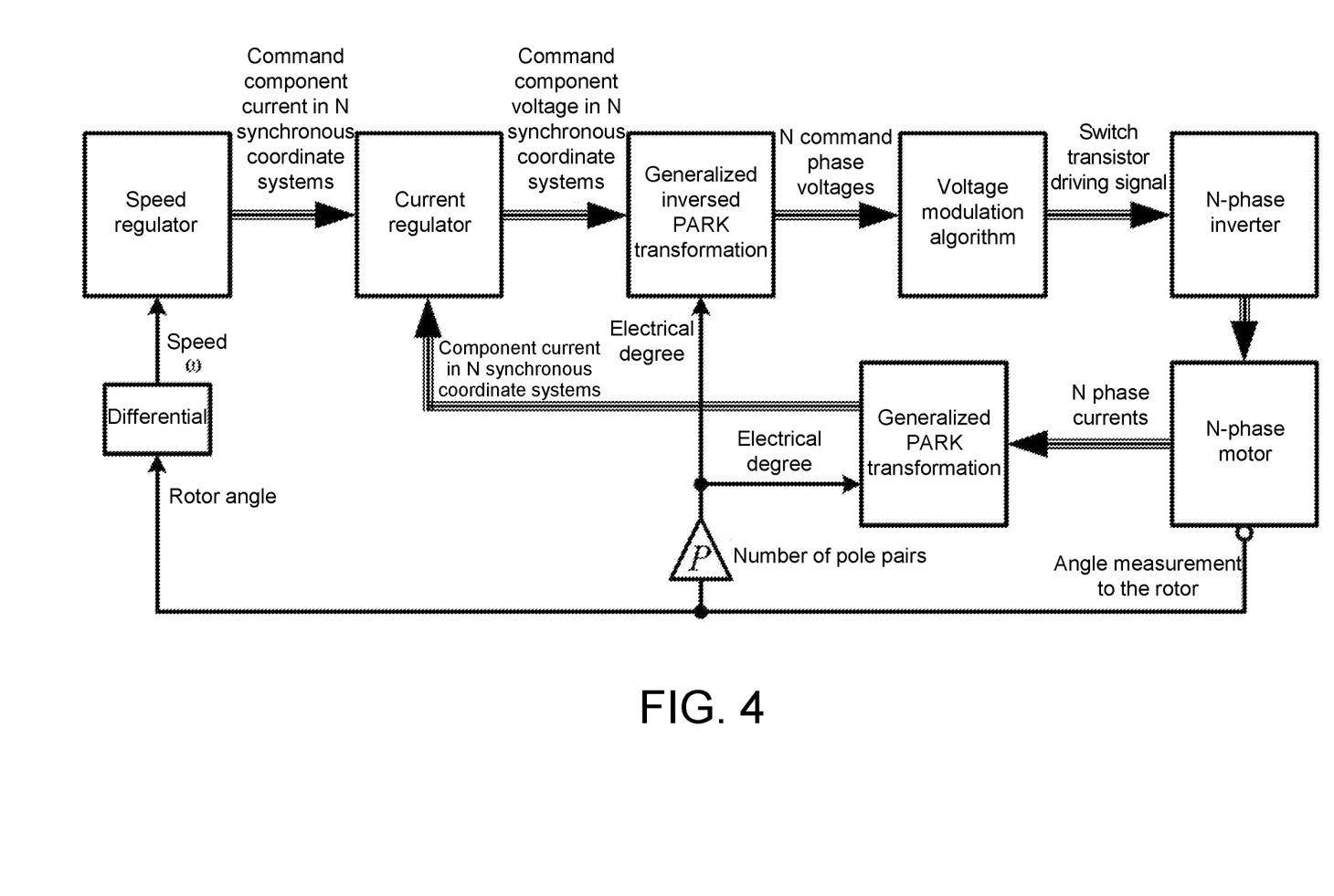
FIG. 4 is a flow chart of the general multi-phase motor vector control system.

This common mode voltage injection carrier comparison PWM strategy performs the coordinate transformation twice. Due to the higher complexity and the greater calculation of the transformation matrix, it can be found that in the matrix obtained from the two-time coordinate transformation, the trigonometric functions can correspond one-to-one. Therefore, in a control cycle, the value of the transformation matrix is only required to be calculated once but not twice, and thus reducing half of calculation. In addition, the PWM modulation method can be combined with the vector control technology of multi-phase motors to achieve simplified calculations. As shown in FIG. 4, which is a flow chart of the general multi-phase motor vector control system. In the vector control of general multi-phase motors, currents of each phase of the motor are collected, and the d-axis and q-axis currents and the zero-axis current in the generalized PARK coordinate system can be obtained through the generalized PARK transformation. Each current component vector is subjected to closed-loop control through the current regulator, thereby obtaining the corresponding reference values of the d-axis and q-axis voltage and zero-axis voltage. Then, the command value of the phase voltage is obtained by generalized inverted PARK transformation, and the driving signal of the inverter switching device is obtained through the voltage modulation process.

Figure 5:
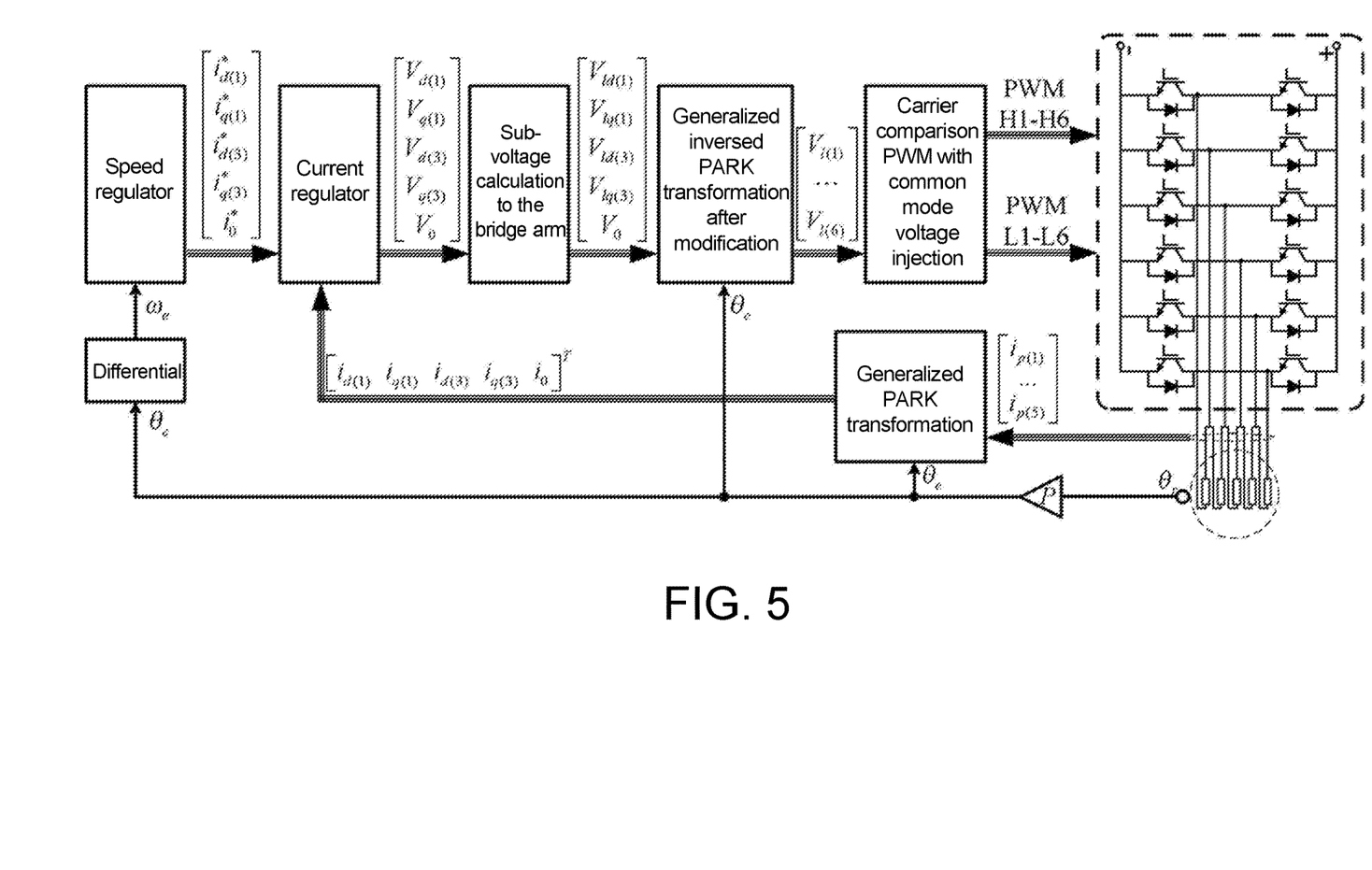
FIG. 5 is a structural diagram of a five-phase motor drive control system provided by the disclosure.

When the modulation algorithm implemented by the disclosure is adopted, the intermediate two-time coordinate transformation can be directly simplified to obtain the structure diagram of the five-phase motor vector control system shown in FIG. 5. Under such circumstances, the vector control system of the five-phase motor only needs to perform the coordinate transformation twice, not four times, which greatly simplifies the calculation complexity.

It is easy for those skilled in the art to understand that the above are only preferred embodiments of the disclosure and are not intended to limit the disclosure. Any modification, equivalent replacement and improvement made within the spirit and principle of the disclosure should fall within the scope of the disclosure to be protected.

The disclosure can reduce the number of power devices in the inverter topology, reduce the capacity of the inverter system, reduce the cost of drive system, increase power density, improve DC voltage utilization rate, enhance the topology fault tolerance, and realize control of complete freedom of stator current.

What is claimed is:

1. An N-phase N+1 bridge arm inverter, characterized in comprising: N+1 bridge arms, each of the bridge arms comprising: an upper bridge arm power switching device and a lower bridge arm power switching device, upper node of the upper bridge arm power switching device in each of the bridge arms is connected to a DC bus voltage, lower node of the lower bridge arm power switching device is connected to a power ground, and lower node of the upper bridge arm power switching device is connected to upper node of the lower bridge arm power switching device as an output node of the bridge arm;

wherein N is a total phase number of a motor, N is an odd number, and N is greater than 3.

2. The N-phase N+1 bridge arm inverter of claim 1, characterized in that when stator windings of the motor are symmetrically distributed, a phase difference between adjacent corresponding electromotive forces is $\alpha=2\pi/N$.

3. The N-phase N+1 bridge arm inverter of claim 1, characterized in that, starting from a first phase, all stator windings are arranged in an order of electrical angle interval $\Delta n\alpha$ and connected end to end, thereby leading to N+1 motor winding nodes; $\Delta n$ is the number of arrangement intervals, the value of $\Delta n$ is taken from integers of 1 to $(N-1)/2$ that are relatively prime to N, the value of each $\Delta n$ corresponds to a connection sequence of a phase winding, and the N+1 motor winding nodes are sequentially connected to N+1 bridge arm output nodes.

4. The N-phase N+1 bridge arm inverter of any of claim 1, characterized in that a relationship between output voltage vectors of the N+1 bridge arms and N phase voltage vectors is that, the phase voltage is equal to the bridge arm voltage connected at its right node minus the bridge arm voltage connected at its left node; where $V_{p(i)}=V_{l(k)}-V_{l(k+1)}$ i,k∈(1, 2, . . . , n), wherein an N-dimensional phase voltage vector is $[V_{p(1)}, V_{p(2)}, \ldots, V_{p(n)}]^T$, an N+1-dimensional arm voltage vector is $[V_{l(1)}, V_{l(2)}, \ldots, V_{l(n+1)}]^T$.

5. A modulation method for an N-phase N+1 bridge arm inverter, characterized in comprising the following steps:

according to a relationship between output voltage vectors of N+1 bridge arms and N phase voltage vectors: a phase voltage is equal to a bridge arm voltage connected at its right node minus a bridge arm voltage $V_{p(i)}=V_{l(k)}-V_{l(k+1)}$ connected at its left node to obtain N+1 bridge arm voltage values;

N+1 bridge arm voltage values are compared with a carrier triangle wave to obtain a real-time duty ratio, and square wave drive signals of each bridge aim power device are generated according to the real-time duty ratio to realize a carrier-mode PWM voltage modulation of common mode voltage injection.

6. The modulation method of claim 5, characterized in that when the number of arrangement intervals is $\Delta n=(N-1)/2$, the maximum fundamental phase voltage amplitude generated by the N-phase N+1 bridge arm inverter is a DC bus voltage $U_{dc}$.

7. The modulation method of claim 5, characterized in that under a generalized synchronous coordinate system, voltage values of the N+1 bridge arms are obtained according to the relationship between the output voltage vectors of the N+1 bridge arms and the N phase voltage vectors, i.e., $V_{p(i)}=V_{l(k)}-V_{l(k+}1)$.

* * * * *